(12) United States Patent
Clemm et al.

(10) Patent No.: US 7,562,140 B2
(45) Date of Patent: Jul. 14, 2009

(54) METHOD AND APPARATUS FOR PROVIDING TREND INFORMATION FROM NETWORK DEVICES

(75) Inventors: L. Alexander Clemm, Los Gatos, CA (US); Petre Dini, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 609 days.

(21) Appl. No.: 11/280,557

(22) Filed: Nov. 15, 2005

(65) Prior Publication Data

US 2007/0112955 A1  May 17, 2007

(51) Int. Cl.
*G06F 15/173* (2006.01)
(52) U.S. Cl. .............. 709/224; 709/217; 709/219; 709/223; 709/248; 709/250; 707/2; 707/3; 707/9; 715/742; 715/760; 715/764; 715/846
(58) Field of Classification Search .............. 709/224
See application file for complete search history.

(56) References Cited

U.S. PATENT DOCUMENTS

| | | | | |
|---|---|---|---|---|
| 5,696,701 | A * | 12/1997 | Burgess et al. | 714/25 |
| 5,796,633 | A * | 8/1998 | Burgess et al. | 702/187 |
| 6,006,016 | A * | 12/1999 | Faigon et al. | 714/48 |
| 6,006,171 | A * | 12/1999 | Vines et al. | 702/184 |
| 6,167,538 | A * | 12/2000 | Neufeld et al. | 714/47 |
| 6,269,330 | B1 * | 7/2001 | Cidon et al. | 714/43 |
| 6,339,750 | B1 * | 1/2002 | Hoyer et al. | 702/182 |
| 6,349,335 | B1 * | 2/2002 | Jenney | 709/224 |
| 6,701,449 | B1 * | 3/2004 | Davis et al. | 714/4 |
| 7,007,084 | B1 * | 2/2006 | Chakravarti et al. | 709/224 |
| 7,293,052 | B1 * | 11/2007 | Kavasseri | 709/229 |
| 2001/0042227 | A1 * | 11/2001 | Stephenson et al. | 714/47 |
| 2001/0056486 | A1 * | 12/2001 | Kosaka | 709/224 |
| 2006/0104220 | A1 * | 5/2006 | Yamazaki et al. | 370/254 |

OTHER PUBLICATIONS

S. Waldbusser, "Remote Network Monitoring Management Information Base," IETF Network Working Group RFC 2819, May 2000, pp. 1-92.

(Continued)

*Primary Examiner*—Firmin Backer
*Assistant Examiner*—Arvin Eskandarnia
(74) *Attorney, Agent, or Firm*—Hickman Palermo Truong & Becker LLP

(57) ABSTRACT

A method of providing performance trend information from a device in a packet-switched network to a network management station comprises maintaining in the device one or more state variables that store values associated with data processing functions of the device; storing in the device a trend indicator value and a trend tendency value, both associated with a particular state variable among the state variables; periodically sampling the particular state variable to obtain one or more sampled values; determining and updating the trend indicator value with a direction of change in the sampled values of the particular state variable over a particular time; determining and updating the trend tendency value with a rate of change in the one or more sampled values of the particular state variable over the particular time; and sending the trend indicator value and the trend tendency value to the network management station.

27 Claims, 5 Drawing Sheets

OTHER PUBLICATIONS

S. Waldbusser, "Introduction to the Remote Monitoring (RMON) Family MIB Modules," IETF Network Working Group RFC 3577, Aug. 2003, pp. 1-29.

Anonymous, "Cisco PIX Firewall Command Reference Version 6.3," Cisco Systems, Inc., San Jose, California, 2004, pp. 1-450.

Anonymous, "Cisco PIX Device Manager 2.1," Cisco Systems, Inc., San Jose, California, 2002, pp. 1-541.

Anonymous, "Cisco PIX Device Manager 1.1," Cisco Systems, Inc., San Jose, California, 2001, pp. 1-256.

* cited by examiner

FIG. 3A
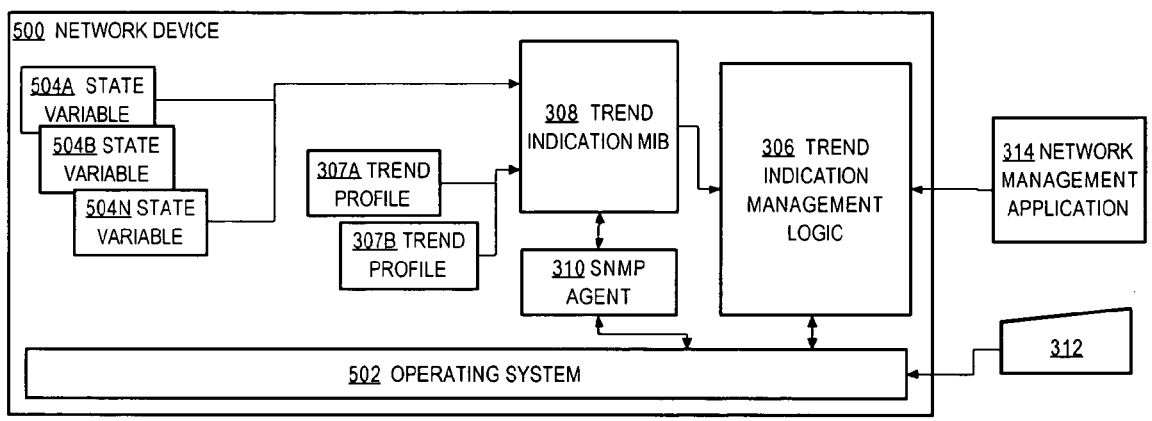
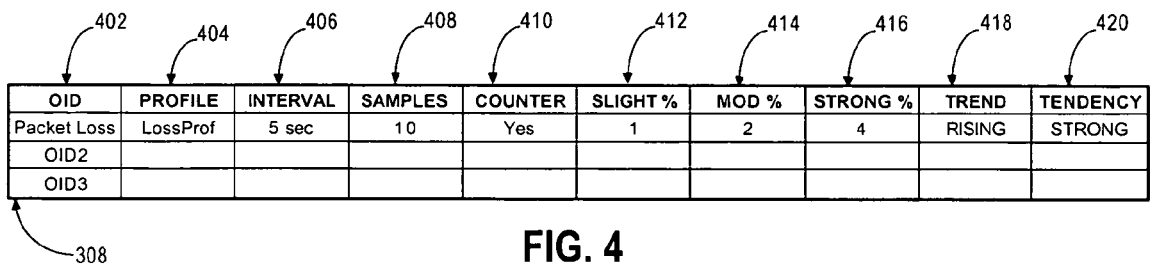
FIG. 4

METHOD AND APPARATUS FOR PROVIDING TREND INFORMATION FROM NETWORK DEVICES

FIELD OF THE INVENTION

The present invention generally relates to management of computer network infrastructure devices such as routers and switches. The invention relates more specifically to techniques for determining values of state variables that are maintained in the network devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer network infrastructure devices such as routers and switches store values for many types of state variables as part of normal operation. The state variables may include numerous types of counters, such as packet loss counters. Network administrators typically examine discrete values of the state variables at a particular point in time, also termed obtaining a "snapshot" of a state variable value, when a device is experiencing problems and when the current performance status of the device is reviewed.

However, such a snapshot may not provide a complete picture of performance issues associated with the device. Specifically, a snapshot value does not convey the trend and the tendency of a particular state variable—that is, is the value of the state variable getting better or getting worse? Is the trend accelerating or decelerating? Answers to these questions are important to assess a proper course of action.

Determining a trend and a tendency for a state variable requires observation of the device and the state variable over time. Thus, one approach to assess a trend and a tendency of a state variable is for a management station or network administrator to repeatedly poll the device to request a different snapshot of the state variable at successive times. However, such a repetitive polling of counters and state variables imposes a large strain on the performance of management applications, uses excessive processing resources of managed devices, does not scale well in networks that have thousands of devices, and introduces a dependency on expensive management applications to determine trend and tendency values.

Further, devices often do not store historical values for the state variables; therefore, the needed information may be unavailable when a snapshot is taken. Even if historical information were present in a device, determination of trends based on the historical information would require additional computation power and analysis logic in management applications.

Based on the foregoing, there is a clear need for a way to obtain trend and tendency information for state variables in network devices, without incurring the overhead of continuous monitoring or repetitive polling.

Some management information bases (MIBs) define notifications that can be emitted in case certain events are occurring, including events related to performance variations. An example is the Remote Network MONitoring (RMON) MIB, in which setting a notification variable causes the system to deliver notifications about changes in RMON values. The use of such notifications requires the presence of a powerful management application integrating diagnosis and event processing. Coverage of those notifications is generally incomplete. Furthermore, notifications do not address the problem of providing information on-demand at arbitrary points in time.

Certain management applications provide trending over past statistical data, but obtaining such trending requires data to be collected from the application over some period of time and to be computed by the application, not the device. Further, a trend indication of an alarm state may be communicated through an alarm (e.g., an alarm may include a state value of "severity major, deteriorating" after a previous severity had been "minor"). However, such alarm information refers to alarm state, not to a general statistical counter, and is not something that can be retrieved on demand.

The NetFlow application that is integrated into Cisco IOS® Software from Cisco Systems, Inc., San Jose, Calif., maintains a statistics database on the device including certain historical data and provides summation functions. However, the NetFlow service can report historical data only on flow data available through NetFlow, not any state variable represented by any MIB in a device. Further, NetFlow cannot deliver trend and tendency data for a particular state variable to an application on demand; instead, applications are continuously exposed to a flow of data from the device. The summary functions of NetFlow, which aggregate data from multiple flows, are different from trend and tendency functions, which mathematically convey the first and second deviation of the function of the state variable over time (x axis time, y axis value of the state).

Other network device features such as RMON and PDM/PIX offer a capability to collect and maintain certain statistics on a device, for instance the snapshot of certain statistical parameters at certain time intervals, but not trend and tendency information. For example, RMON provides a History Control Group that allows values representing a history of various network media to be kept on an RMON agent on a network device; however, there is no computation of trend or tendency. RMON provides a User History feature that allows values representing history to be stored on the device; there is no computation of trend or tendency.

The Cisco PIX Firewall allows certain statistics values to be collected and maintained, including interface statistics, feature statistics, failover statistics, connection performance statistics, DHCP statistics, etc., and displayed as graphs in PDM, an application hosted outside the device. A user or management application can determine a trend or tendency only through further manipulation of the information and only outside the device; the firewall or device do not internally compute and cannot deliver trend and tendency immediately upon demand.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a block diagram showing an example software architecture for a network device that hosts logic for providing trend information from the network device;

FIG. 4 is a table illustrating an example management information base (MIB) that may be used in one embodiment.

DETAILED DESCRIPTION

Figure 1:
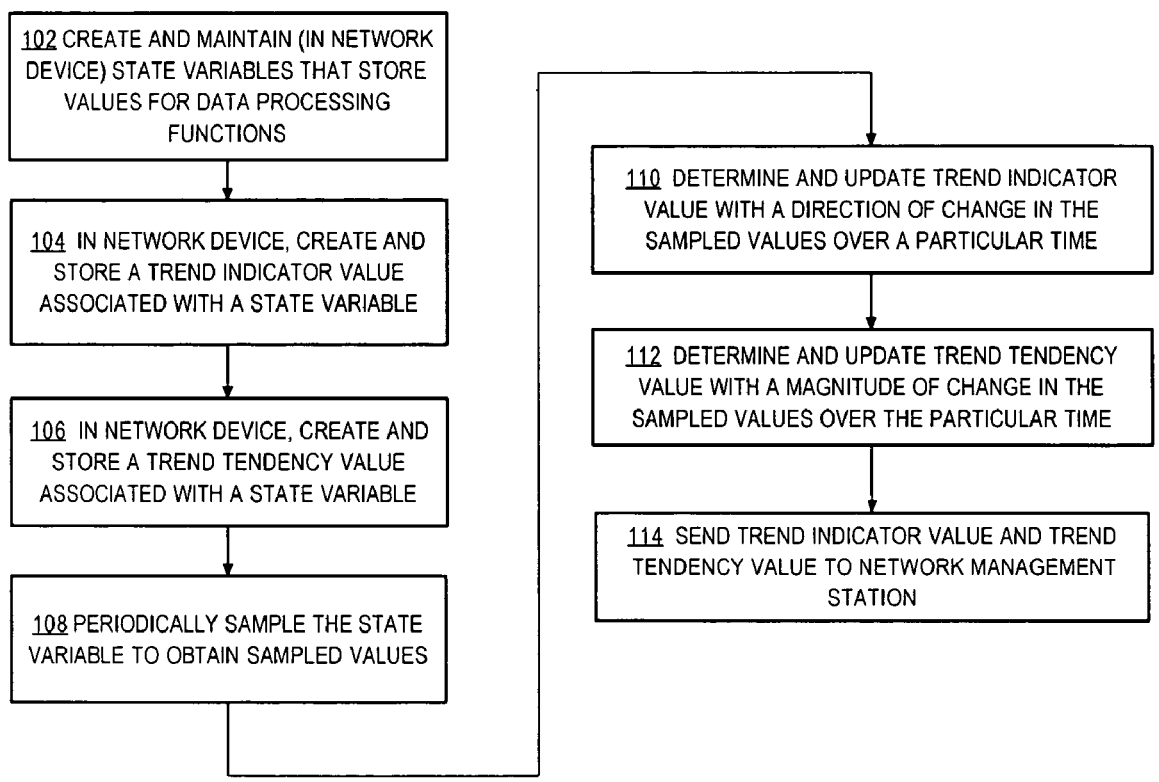
FIG. 1 is a flow diagram that illustrates a high level overview of one embodiment of a method for providing trend information from a network device.

A method and apparatus for providing trend information from network devices are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Providing Trend Information from Network Devices
   3.1 Computation of Trend and Tendency
   3.2 Accessing a Trend Management Function Through a Management Interface
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for providing performance trend information from a device in a packet-switched network to a network management station comprises maintaining in the device one or more state variables that store values associated with data processing functions of the device; storing in the device a trend indicator value and a trend tendency value, both associated with a particular state variable among the state variables; periodically sampling the particular state variable to obtain one or more sampled values; determining and updating the trend indicator value with a direction of change in the sampled values of the particular state variable over a particular time; determining and updating the trend tendency value with a rate of change in the one or more sampled values of the particular state variable over the particular time; and sending the trend indicator value and the trend tendency value to the network management station.

According to one feature of this aspect, the method further comprises receiving first information from the network management station that specifies the particular state variable, and creating and storing the trend indicator value and the trend tendency value associated with the particular state variable identified in the first information only in response to receiving the first information.

In another feature, the trend indicator value and the trend tendency value are sent to the network management station in response to receiving a request from the network management station. In another feature, the particular time is any time in a range of about one millisecond to about one year.

In a further feature, the method comprises receiving first information from the network management station that specifies the particular state variable and the particular time; selecting a sampling interval that is less than and based on the particular time; and performing the periodic sampling by repeatedly sampling the particular state variable at the sampling interval during the particular time and storing a plurality of sampled values of the particular state variable in a circular buffer. In a related feature, the sampling interval is selected as sufficiently small to avoid missing spikes in values of the particular state variable.

In still another feature, the trend indicator value is determined based upon whether a difference in two or more values of the particular state variable in the particular time exceeds a specified threshold. In yet another feature, the trend tendency value is determined based upon a rate of the change in the sampled values.

In another feature, the method further comprises receiving first information from the network management station that specifies any one or more of: a sampling time interval; a number of samples required to establish a trend; a type value specifying whether the state variable represents a counter or a gauge; and a threshold value required to establish a trend.

In other aspects, the invention encompasses a computer apparatus and a computer-readable medium configured to carry out the foregoing steps. For example, a router or switch for a packet-switched network, configured to perform the functional steps described herein, are examples of apparatus that the invention encompasses.

2.0 Structural and Functional Overview

According to one embodiment, a network device includes functional logic that implements a trend indication management function. For example, a router or a switch in a packet-switched network host one or more computer programs or other software elements that implement the trend management function as described herein; the software elements may comprise applications or agents of an operating system that the devices host, or may be integrated into the operating system. The trend management function maintains trend information for a configurable set of counters, gauges, or other state variables at the device. The trend management function allows users to retrieve on demand the trend, and the tendency of the trend, for a particular state variable that the device manages. In this description, the term "user" broadly includes management applications or human users. In this approach, an application can retrieve trend and tendency information when it is needed, and only then, and without repetitive polling or computation at the application.

Figure 2:
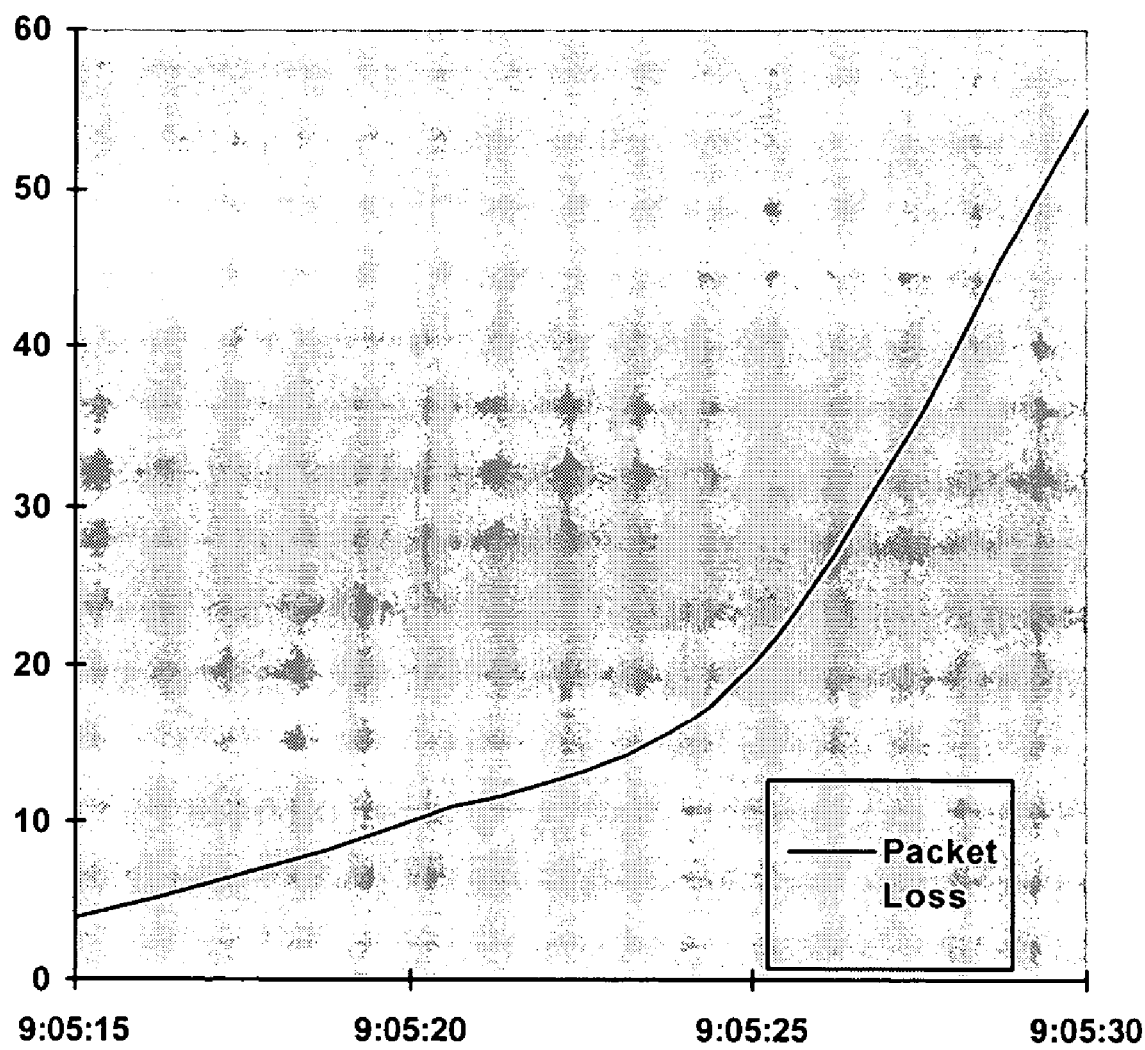
FIG. 2 is a graph illustrating a change in a state variable value over time.

To illustrate the foregoing approach, FIG. 1 is a flow diagram that illustrates a high level overview of one embodiment of a method for providing trend information from a network device, and FIG. 2 is a graph illustrating a change in a state variable value over time. Referring first to FIG. 1, in step 102, state variables that store values for data processing functions are created and maintained in a network device. For example, an operating system of a network device may create and manage various counters and gauges that track performance of functions or features of the device, such as packet loss, threshold violations, ports disabled, etc.

In step 104, in the network device a trend indicator value associated with a particular state variable is created and stored. Step 104 may involve configuration of the trend indicator value in response to user input or a management application request that specifies the state variable. Approaches for configuring trend indicator values are described further below.

In step 106, in the network device a trend tendency value associated with the particular state variable is created and stored. Step 106 may involve configuration of the trend tendency value in response to user input or a management application request that specifies the state variable. Approaches for configuring trend indicator values are described further below.

In step 108, the particular state variable is periodically sampled, to result in obtaining sampled values. The sampled values may be stored in any appropriate storage within the network device, such as in main memory, in any appropriate data structure that enables retaining a set of sampled values.

In step 110, a trend indicator value is determined and updated based on the sampled values. The trend indicator value represents a direction of change in the sampled values over a particular period of time. In step 112, a trend tendency value is determined and updated. The trend tendency value represents a rate of change in the sampled values over the particular time. Thus, by analogy a tendency value indicates whether the trend is accelerating or decelerating. In step 114, the trend indicator value and trend tendency value are sent from the host device to a network management station.

The approaches of FIG. 1 are performed in a network device. In this context, "network device" broadly refers to any data processing device or software system, including any managed network infrastructure elements, such as a router or switch, a computing device configured as a network end station, such as a workstation, server, or printer, and software elements that manage state variables internally.

In one embodiment, the trend management function provides output indicating whether a values of a particular state variable have been rising or falling over time, and whether the rise or fall has been strong or weak. In an embodiment, trend and tendency functions provided within the trend management function mathematically convey the first and second deviation of the function of the state variable over time.

Referring now to FIG. 2, an example graph of a state variable includes a curved line representing values of a state variable indicating a packet loss count over a period of time for a particular interface of a network device such as a router. Time is indicated in the X-axis and ranging from the time 09:05:15 am to 09:05:30 am in 5-second intervals. The Y-axis represents the number of packets counted as lost. At a first time point 09:05:15 the packet loss count is about 4; at time=09:05:20 the packet loss count is about 10; at time 09:05:25 the packet loss count is about 16; and at time 09:05:30 the packet loss count is about 55. Thus, the trend of the packet loss counter state variable may be termed as "increasing," because the number of lost packets is increasing over time, and the tendency of the state variable may be termed as "worsening," because the line representing the state variable is concave and more packets are being lost at later time intervals.

In one embodiment, the trend management function is configured to deliver shorter-term trends, over time spans ranging from few seconds to few minutes, which are useful in diagnosing and troubleshooting a network. In another embodiment, the trend management function is configured to deliver longer-term trends, over time spans ranging for hours, which are useful in capacity planning.

In an embodiment, the trend management function provides the following operations: Set or delete a trend monitor for a state variable comprising a counter or gauge in response to a configuration request; provide trend and trend tendency values for the state variable from the function hosted on the device to a requesting management application or user in response to a request; and optionally provide automatic notification of trend changes for the state variable in response to a configuration request.

In various embodiments, a human user may issue the configuration requests to the trend management function using a command-line interface of the network device that is coupled to the trend management function, or an application may issue the configuration requests through an API that the trend management function exposes to applications, or SNMP GET or SET operations may accomplish configuration of the trend management function and retrieval of data.

In one embodiment, the trend management function is coupled with alerting functions to notify a user if a change in trend is occurring, for example if a trend is reversing.

In one implementation, the trend management function periodically samples one or more state variables that are to be monitored for their trend in certain time intervals. The trend management function internally maintains state values sufficient for use in computing trend and tendency. For example, the trend management function creates, stores and maintains a plurality of values of a state variable that have been sampled at a plurality of discrete points in time that immediately precede the current point in time. The values can be stored for example in a circular buffer, with the newest sample overriding the oldest sample.

In one embodiment, sampling interval is selected to be sufficiently small to avoid missing spikes in the values of the state variable. Enough samples are maintained to be able to distinguish a temporary aberration from a trend. In an embodiment, the method takes into account a set of the most recent samples that are sufficient to indicate a trend, generally at least three samples, and possibly more. Alternatively, the sampling interval is selected to miss spikes. Because the user is interested in a trend and tendency, a spike can be considered an aberration, so if a spike is missed it is not detrimental to the value of the trend indication function.

The particular state variables that are monitored for their trends are user configurable. Requiring a user to configure one or more state variables for monitoring, rather than computing and maintaining trend and tendency information for all state variables of a device, reduces the performance impact of the trend management function on the device.

In one view, values of a state variable constitute a function that can be plotted as a curve over time. In this view, a trend value as computed by the trend management function reflects the first deviation of the curve, indicating whether the curve is increasing or decreasing, and the tendency value represents the second deviation of the function, indicating whether the curve is concave or convex.

Accordingly, embodiments provide a method and apparatus that can provide information on trend and tendency for a configurable set of parameters that indicate state for a device and that may change over time. The embodiments allow users and management applications to retrieve a reading on the trend and tendencies over time as part of information retrieved from the device. Various embodiments are usable, for example, in embedded management instrumentation for any network infrastructure device, including routers and switches that host an internetworking operating system, SNMP agents, etc.

Various embodiments offer numerous technical benefits. For example, embodiments enable devices to offer a meaningful reading of health data when management applications request a snapshot of device information. Trends as well as tendencies can be recognized without requiring additional application support, in response to a request to the device to deliver trend and tendency information. The ability to notify about changing trends and tendencies allows users to spot impending problems early and manage a network actively. Embodiments provide improved scale and performance characteristics when compared with approaches that require an application to perform repetitive polling.

3.0 Providing Trend Information from Network Devices

This section describes further details about how trend and tendency values can be computed, and how the trend indication management function can be exposed over a management interface, in various embodiments. While this section provides more specific details about various embodiments, the details herein merely provide examples, are not essential and are not intended to limit the scope of all embodiments.

3.1 Computation of Trend and Tendency

In various embodiments, the trend indication management function computes a trend value and a tendency value in any of several ways.

In one embodiment, for a state variable comprising a gauge, a trend is established if from the current time to the first time interval in the sample, the difference in values of the state variable exceeds a configurable threshold value. In this embodiment, in addition, to qualify as a trend, a configurable majority of differences between adjacent data points in the sample point need to have the same direction. For example, a trend is indicated if 60% of the differences between successive sampled values all are increasing, or if 60% are decreasing. The value of 60% as a threshold may be changed through a user configuration operation.

In an alternative embodiment, a trend is indicated if the value of a state variable is greater than a specified portion of an absolute value of the state variable. For example, a trend may be indicated for a gauge if the value of the gauge exceeds 2% of the gauge's absolute value or minimum value.

In various embodiments, a trend is categorized using designations such as "improving" or "falling", "deteriorating" or "rising", and "stable". In other embodiments, the trend is further refined as "slightly," "moderately," or "strongly" rising or falling, depending on the rate of the observed change. Threshold values that determine whether a trend is categorized as "slightly" or "strongly" changing may be modified using a user configuration operation.

In another alternative, designations such as "unstable - falling" and "unstable - rising" indicate that there a significant delta exists between the first and current time intervals in the sample, but that the data points in between do not point in the same direction. Thus, with such designations, the second criterion specified above, that a configurable majority of differences between adjacent data points in the sample point need to have the same direction, is not satisfied. Accordingly, there is no clear stable trend based on the above criteria. Such a condition may occur when values of a state variable are oscillating, for example.

To determine a tendency value, in one embodiment, the trend indication management function can be determined by maintaining numeric values of the last several trend values, stored as the difference between the first and the last sample of their respective time period, and computing a trend of such values. Thus, the tendency value may reflect a "trend of the trend".

To illustrate a tendency value, assume the following sequence of state values is observed at points in time t1, t2, and t3: 5, 7, 10. The trend is increasing, because a positive difference exists between t3, t2, and t1. The tendency is accelerating, because the difference at t3 and t2 is 3, which is greater than the difference between t2 and t1, which is 2. As a further example, assume that values at t1, t2, and t3 are 2, 10, and 15. The tendency is decelerating, because (t3−t2=5) is less than (t2−t1=8), even although absolute values are larger.

For a state variable comprising a counter, the trend value and the tendency value are calculated in an analogous manner. In the case of a counter, the relative increase of the state variable value is analyzed in comparison to a previous value of the same state variable. In effect, the trend value is the second deviation, and the tendency is the third deviation of a function of the counter values over time.

FIG. 3A is a block diagram showing an example software architecture for a network device that hosts logic for providing trend information from the network device. In one embodiment, a network device 500 hosts an operating system 502, SNMP agent 310, and trend indication management logic 306. Network device 500 is any element of infrastructure for a packet-switched network, such as a router or switch. Operating system 502 supervises operation of physical resources of the device 500 and hosts one or more applications, agents, or modules for performing specific packet processing functions. SNMP agent 310 is one such application, and implements simple network management protocol.

Trend indication management logic 306 comprises one or more computer programs or other software elements that implement the functions of FIG. 1. In one embodiment, trend management logic may form part of statistics management information bases (MIBs) and supporting logic in Cisco IOS® Software. Further, trend indication management logic 306 may be coupled to an embedded event manager that may receive output trend values and tendency values, package the values in event messages, and publish the event messages to subscribing applications or services within or outside device 500.

The trend indication management logic 306 is coupled to a trend indication MIB 308 within device 500, and the MIB can access one or more state variables 504A, 504B, 504N, and one or more trend profiles 307A, 307B. For purposes of illustrating a clear example, FIG. 3A shows three (3) state variables and two (2) trend profiles; however, practical implementations may use any number of state variables and trend profiles.

In an embodiment, MIB 308 comprises a table that associates identifiers of state variables with trend profiles and with corresponding trend values and tendency values. Alternatively, MIB 308 comprises a table that associates identifiers of state variables with a plurality of configuration parameters that determine how the trend values and tendency values are computed, and also associates the identifiers with the trend values and tendency values. An example of MIB 308 is shown in FIG. 4 and described further below.

The state variables 504A, 504B, 504N are values that the operating system 502 or its applications create and store in the ordinary course of operation, for tracking performance of one or more functions or features of the operating system or the applications.

Each of the trend profiles 307A, 307B is a set of configured values that determine how trend indication management logic 306 computes and reports a trend value and tendency value for one or more state variables. As further described below, trend indication MIB 308 is configured to associate one or more state variables 504A, 504B, 504N with a particular trend profile 307A, 307B. For example, in MIB 308, state variable 504A could be associated with trend profile 307A, and state variable 504N could be associated with trend profile 307B. As a result, trend indication management logic 306 would determine and report a trend value and tendency value for state variable 504A in a different manner than for state variable 504N.

A network management application 314 is coupled to or can access trend indication management logic 306. Application 314 may comprise any system of software, hardware or a combination that typically performs any of the FCAPS functions of network management and can access trend indication management logic 306 by calling methods or functions of an application programming interface (API) that the trend indication management logic provides. Additionally or alternatively, a console 312 may be coupled to device 500 through a console interface to enable a user to enter command-line interface commands or to perform other configuration operations that configure or affect operation of trend indication management logic 306, MIB 308, and trend profiles 307A, 307B. Additionally or alternatively, an embedded event manager may be coupled to trend management logic 306.

Figure 3B:
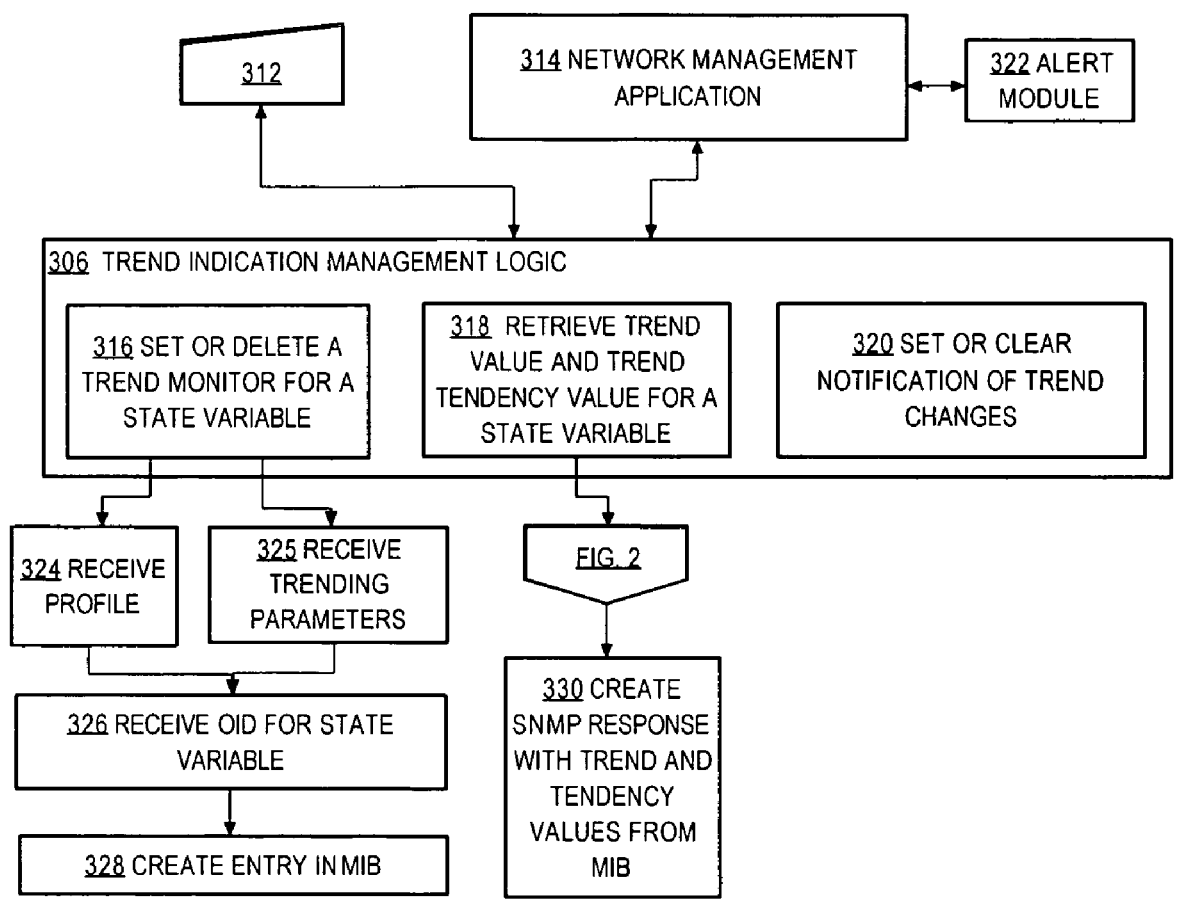
FIG. 3B is a block diagram showing further details of the functions of FIG. 3A.

FIG. 3B is a block diagram showing further details of the functions of FIG. 3A. In one embodiment, network management application 314 is coupled to or includes an alert module 322. Thus, in the embodiment of FIG. 3B the trend management logic 306 is coupled with alerting functions to notify a user if a change in trend is occurring, for example if a trend is reversing.

Using console 312 or application 314 through an API, a user can access a plurality of functions of trend management logic 306. In an embodiment, trend management logic 306 has a first function 316 that can set or delete a trend monitor for a state variable, a second function 318 that can retrieve a trend value and trend tendency value for a state variable, and a third function 320 that can set or clear a flag that causes notification of trend changes.

To set a trend monitor for a state variable using first function 316, trend management logic 306 receives information identifying a trend profile, as indicated in step 324. For example, a user may create and store trend profiles 307A, 307B on device 500 using a configuration command or function, giving a unique identifier or name to each trend profile. At step 324, the user provides the profile identifier or name to trend indication management logic 306 as part of a CLI command or API call.

Alternatively, trend management logic 306 receives information identifying one or more trending parameters, as indicated in step 325. The trending parameters may comprise values for the columns of trend indication MIB 308 that drive determination of a trend value and a tendency value, such as the columns described in the next section and with reference to FIG. 4.

At step 326, the trend management logic 306 receives a state variable identifier, such as an object identifier (OID) of a MIB variable that the operating system 502 or an application or agent maintains in a MIB other than trend indication MIB 308. In step 328, trend management logic 306 creates a row entry in trend indication MIB 308 that associates the OID either with the profile identified at step 324, or with the parameters received at step 325, and that includes columns for a trend value and a tendency value. Thereafter, trend management logic 306 determines the trend value and tendency value for the new row in the MIB 308 based on the approach of FIG. 2.

The approach herein controls performance impact on a network device by configuring trend and tendency computation only for selected state variables that are user specified. This approach requires far less computing resources than an approach in which all state variables of a device are configured for trend and tendency computation. In an alternative embodiment, the trend management logic 306, a device, a device operating system, or an application may specify a default set of device state variables for which a trend monitor is always configured, for example, at device startup or when the trend management logic initializes.

Deleting a trend monitor involves a user providing an OID for a state variable and a request to delete the trend monitor. In response, trend management logic 306 deletes a row in MIB 308 corresponding to the state variable OID.

To retrieve a trend value and trend tendency value for a state variable using second function 318, a user provides a request to trend indication management logic 306. If the user previously set a trend monitor for the same state variable that is identified in the request, then using the approach of FIG. 2 the trend management logic 306 has computed a trend value and a tendency value for the state variable and stored the values in columns of MIB 308. Therefore, in response to the request the trend management logic 306 retrieves the values from the columns of the MIB 308 and provides the values to the requesting user. Unlike prior approaches, no repetitive polling is required, and the device can deliver the trend value and tendency value promptly "on demand" or upon request from a user. In an embodiment, in step 330 trend management logic 306 creates an SNMP response that contains the trend and tendency values from the MIB 308, and sends the SNMP response to the user.

To set or clear a flag that causes notification of trend changes using third function 320, the user sends a command or API call to the trend management logic 306 containing a request to set or clear notification. In response, the trend management logic 306 internally sets or clears a flag that controls issuance of notification messages.

3.2 Accessing a Trend Management Function Through a Management Interface

In various embodiments, the trend indication management function is exposed to users through various management interfaces. Embodiments are not dependent on a particular management protocol.

In one embodiment, a management application uses SNMP to retrieve values that the trend indication management function computes at a device, which are stored in a trend indication MIB at the device. FIG. 4 is a table illustrating an example management information base (MIB) that may be used in one embodiment. A trend indication MIB 308 comprises a user-configurable table having a plurality of columns 402-420. Each row in the table corresponds to one particular object identifier (OID) as shown in OID column 402, and that corresponds to and uniquely identifies a state variable for which a trend is to be monitored. Thus, a configurable column 402 in the trend indication MIB 308 comprises an identifier of the monitored state variable.

In various embodiments, other configurable columns 404-416 in the trend indication MIB 308 comprise one or more of the following:

1. In profile column 404, an identifier of a previously configured trend profile;
2. In interval column 406, a sample interval value, for which an example default value is 1 second;
3. In samples column 408, a number of samples that are required to establish a trend (example default: 10);
4. In counter column 410, a flag indicating whether the observed state variable represents a counter or a gauge, which controls whether the trend indication management function operates with absolute values or deltas;
5. In columns 412, 414, and 416, values for thresholds that determine what state variable values constitute a slight, moderate, or strong trend tendency (for example, in percent of overall difference, such as 1%, 2%, or 4%, respectively.

Various embodiments may include fewer than all of columns 404-416, and also may include columns for values not shown in FIG. 4 that affect operation of the trend indication logic 306 in other ways. For example, the particular columns included in MIB 308 of FIG. 4 may vary depending on the nature of device 500; a router, switch, and server each may have different parameters that govern computation of trend and tendency, represented by different arrangements of columns in the MIB. In an embodiment, values in the columns of MIB 308 are user configurable through a management interface, so that a user can customize operation of the trend indication management function. In an embodiment, each column is associated with a default value, so that a user is not required to configure a column.

In an embodiment, the trend indication MIB 308 further includes a plurality of columns that are readable using SNMP GET operations, and contain a current trend value in column 418 and a current tendency value in column 420.

In an embodiment, values for the configurable columns 406-416 of the trend indication MIB 308 can be specified or modified by user configuration of a trend management profile 307A that is separate from the trend indication MIB. For example, one or more trend management profiles 307A, 307B are hosted in the network device 500 and contain sets of values for all the configurable variables specified above, other than the OID of the state variable to be monitored. Different trend management profiles may have different combinations of values for the configurable variables. One or more OIDs corresponding to one or more state variables are then associated with one of the trend management profiles. A user determines which trend management profile is appropriate to associate with a particular state variable. This approach simplifies configuration and management of multiple state variables for which trends are tracked.

For all such embodiments, while SNMP is identified above as an example protocol for communications between a device that hosts the trend indication management function and a network management station, the same functionality may be accomplished using other management protocols, such as TL-1.

4.0 Implementation Mechanisms—Hardware Overview

Figure 5:
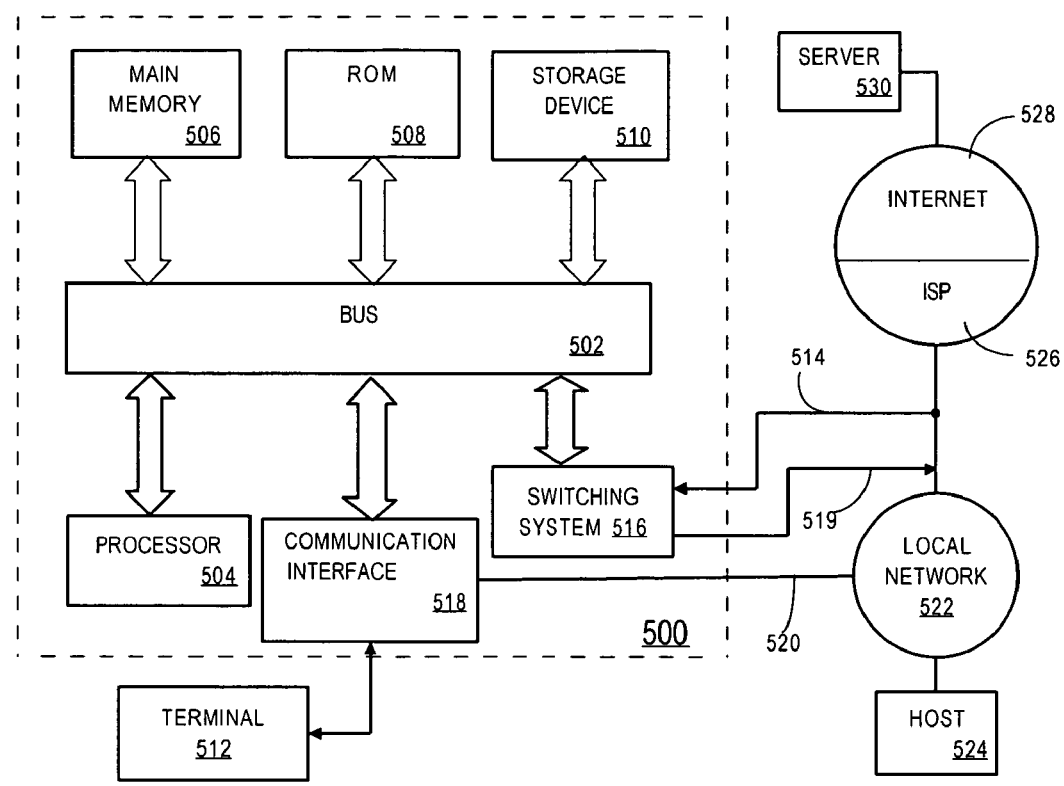
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to predetermined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for providing trend information from network devices. According to one embodiment of the invention, trend information from network devices is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions.

The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for providing trend information from network devices as described herein.

Processor 504 may execute the received code as it is received, and/or stored in storage device 510, or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of providing performance trend information from a routing device or switching device in a packet-switched network to a network management station, the method comprising the computer-implemented steps, performed at the routing device or switching device, of:

creating and maintaining, in the device, one or more state variables that store values associated with data processing functions of the device;

creating and storing, in the device, a trend indicator value and a trend tendency value, both associated with a particular state variable among the one or more state variables;

periodically sampling the particular state variable to obtain one or more sampled values;

determining and updating the trend indicator value with a direction of change in the one or more sampled values of the particular state variable over a particular time;

determining and updating the trend tendency value with a rate of change in the one or more sampled values of the particular state variable over the particular time; and sending the trend indicator value and the trend tendency value from the device to the network management station.

2. A method as recited in claim 1, further comprising the steps of receiving first information from the network management station that specifies the particular state variable, and creating and storing the trend indicator value and the trend tendency value associated with the particular state variable identified in the first information only in response to receiving the first information.

3. A method as recited in claim 1, wherein the trend indicator value and the trend tendency value are sent to the network management station in response to receiving a request from the network management station.

4. A method as recited in claim 1, wherein the particular time is any time in a range of about one millisecond to about one year.

5. A method as recited in claim 1, further comprising the steps of receiving first information from the network management station that specifies the particular state variable and the particular time; selecting a sampling interval that is less than and based on the particular time; and performing the periodic sampling by repeatedly sampling the particular state variable at the sampling interval during the particular time and storing a plurality of sampled values of the particular state variable in a circular buffer.

6. A method as recited in claim 5, wherein the sampling interval is selected as sufficiently small to avoid missing spikes in values of the particular state variable.

7. A method as recited in claim 1, wherein the trend indicator value is determined based upon whether a plurality of differences in two or more values of the particular state variable in the particular time exceed a specified threshold.

8. A method as recited in claim 7, wherein the trend tendency value is determined based upon a rate of change of the differences.

9. A method as recited in claim 1, further comprising the steps of receiving first information from the network management station that specifies any one or more of: a sampling time interval; a number of samples required to establish a trend; a type value specifying whether the state variable represents a counter or a gauge; and a threshold value required to establish a trend.

10. An apparatus for providing performance trend information from a routing device or switching device in a packet-switched network to a network management station, comprising:

a network interface that is coupled to said packet-switched network for receiving one or more packet flows therefrom;

a processor; and means, operable in the device, for creating and maintaining, in the device, one or more state variables that store values associated with data processing functions of the device;

means, operable in the device, for creating and storing, in the device, a trend indicator value and a trend tendency value, both associated with a particular state variable among the one or more state variables;

means, operable in the device, for periodically sampling the particular state variable to obtain one or more sampled values;
means, operable in the device, for determining and updating the trend indicator value with a direction of change in the one or more sampled values of the particular state variable over a particular time;
means, operable in the device, for determining and updating the trend tendency value with a rate of change in the one or more sampled values of the particular state variable over the particular time; and
means, operable in the device, for sending the trend indicator value and the trend tendency value from the device to the network management station.

11. An apparatus as recited in claim 10, further comprising:
means, operable in the device, for receiving first information from the network management station that specifies the particular state variable; and
means, operable in the device, for creating and storing the trend indicator value and the trend tendency value associated with the particular state variable identified in the first information only in response to receiving the first information.

12. An apparatus as recited in claim 10, wherein the trend indicator value and the trend tendency value are sent to the network management station in response to receiving a request from the network management station.

13. An apparatus as recited in claim 10, wherein the particular time is any time in a range of about one millisecond to about one year.

14. An apparatus as recited in claim 10, further comprising:
means, operable in the device, for receiving first information from the network management station that specifies the particular state variable and the particular time;
means, operable in the device, for selecting a sampling interval that is less than and based on the particular time; and
means, operable in the device, for performing the periodic sampling by repeatedly sampling the particular state variable at the sampling interval during the particular time and storing a plurality of sampled values of the particular state variable in a circular buffer.

15. An apparatus as recited in claim 14, wherein the sampling interval is selected as sufficiently small to avoid spikes in values of the particular state variable.

16. An apparatus as recited in claim 10, wherein the trend indicator value is determined based upon whether differences in two or more values of the particular state variable in the particular time exceed a specified threshold.

17. An apparatus as recited in claim 16, wherein the trend tendency value is determined based upon a rate of change of the differences.

18. An apparatus as recited in claim 10, further comprising:
means, operable in the device, for receiving first information from the network management station that specifies any one or more of: a sampling time interval; a number of samples required to establish a trend; a type value specifying whether the state variable represents a counter or a gauge; and a threshold value required to establish a trend.

19. An apparatus for providing performance trend information from a routing device or switching device in a packet-switched network to a network management station, comprising:
a network interface that is coupled to the data network for receiving one or more packet flows therefrom;
a processor;
one or more stored sequences of instructions which, when executed by the processor, cause the processor to carry out, at the device, the steps of:
creating and maintaining, in the device, one or more state variables that store values associated with data processing functions of the device;
creating and storing, in the device, a trend indicator value and a trend tendency value, both associated with a particular state variable among the one or more state variables;
periodically sampling the particular state variable to obtain one or more sampled values;
determining and updating the trend indicator value with a direction of change in the one or more sampled values of the particular state variable over a particular time;
determining and updating the trend tendency value with a rate of change in the one or more sampled values of the particular state variable over the particular time; and
sending the trend indicator value and the trend tendency value from the device to the network management station.

20. An apparatus as recited in claim 19, further comprising the steps of receiving first information from the network management station that specifies the particular state variable, and creating and storing the trend indicator value and the trend tendency value associated with the particular state variable identified in the first information only in response to receiving the first information.

21. An apparatus as recited in claim 19, wherein the trend indicator value and the trend tendency value are sent to the network management station in response to receiving a request from the network management station.

22. An apparatus as recited in claim 19, wherein the particular time is any time in a range of about one millisecond to about one year.

23. An apparatus as recited in claim 19, further comprising the steps of receiving first information from the network management station that specifies the particular state variable and the particular time; selecting a sampling interval that is less than and based on the particular time; and performing the periodic sampling by repeatedly sampling the particular state variable at the sampling interval during the particular time and storing a plurality of sampled values of the particular state variable in a circular buffer.

24. An apparatus as recited in claim 23, wherein the sampling interval is selected as sufficiently small to avoid spikes in values of the particular state variable.

25. An apparatus as recited in claim 19, wherein the trend indicator value is determined based upon whether differences in two or more values of the particular state variable in the particular time exceed a specified threshold.

26. An apparatus as recited in claim 25, wherein the trend tendency value is determined based upon a rate of change of the differences.

27. An apparatus as recited in claim 19, further comprising the steps of receiving first information from the network management station that specifies any one or more of: a sampling time interval; a number of samples required to establish a trend; a type value specifying whether the state variable represents a counter or a gauge; and a threshold value required to establish a trend.

* * * * *